United States Patent
Barnett et al.

(10) Patent No.: US 12,481,642 B2
(45) Date of Patent: *Nov. 25, 2025

(54) METHODS, DEVICES AND SYSTEMS FOR REAL-TIME CHECKING OF DATA CONSISTENCY IN A DISTRIBUTED HETEROGENOUS STORAGE SYSTEM

(71) Applicant: CIRATA INC., San Ramon, CA (US)

(72) Inventors: Granville Lynn Barnett, Newtownabbey (GB); Yeturu Aahlad, Foster City, CA (US)

(73) Assignee: CIRATA, INC., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,050

(22) Filed: Sep. 23, 2024

(65) Prior Publication Data
US 2025/0094409 A1  Mar. 20, 2025

Related U.S. Application Data

(63) Continuation of application No. 18/106,152, filed on Feb. 6, 2023, now Pat. No. 12,189,610, which is a continuation of application No. 17/380,054, filed on Jul. 20, 2021, now Pat. No. 11,657,035, which is a continuation of application No. 16/141,335, filed on Sep. 25, 2018, now Pat. No. 11,100,086.

(51) Int. Cl.
*G06F 16/00* (2019.01)
*G06F 16/23* (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| | | | |
|---|---|---|---|
| 8,316,396 B2* | 11/2012 | Kulick | H04N 21/4828 725/39 |
| 11,645,250 B2* | 5/2023 | Kraytem | G06F 16/215 715/200 |
| 2011/0196828 A1* | 8/2011 | Drobychev | G06F 16/275 707/622 |
| 2018/0260409 A1* | 9/2018 | Sundar | G06F 16/13 |

* cited by examiner

*Primary Examiner* — Bai D Vu
(74) *Attorney, Agent, or Firm* — YOUNG LAW FIRM, P.C.

(57) ABSTRACT

First replicated state machines may execute a sequence of ordered agreements to make mutations to data stored in a first data storage of a first type and second replicated state machines may execute the sequence of ordered agreements to make mutations to data stored in a second data storage of a second type. First metadata of the mutated data stored in the first data storage may then be received and stored, as may second metadata of the mutated data stored in the second data storage. The first and second metadata may be compared when the data stored in the first data storage that corresponds to the first metadata and the data stored in the second data storage that corresponds to the second metadata have settled according to the predetermined one of the sequence of ordered agreements. A selected action may then be carried out depending upon the comparison.

16 Claims, 5 Drawing Sheets

METHODS, DEVICES AND SYSTEMS FOR REAL-TIME CHECKING OF DATA CONSISTENCY IN A DISTRIBUTED HETEROGENOUS STORAGE SYSTEM

CROSS REFERENCE TO RELATED APPLICATIONS

The present application is a Continuation of co-pending and commonly-assigned U.S. application Ser. No. 18/106,152 filed on Feb. 6, 2023, which is a continuation of co-pending and commonly-assigned U.S. application Ser. No. 17/380,054 filed on Jul. 20, 2021, now U.S. Pat. No. 11,657,035 issued May 23, 2023 which is a Continuation of co-pending and commonly-assigned U.S. application Ser. No. 16/141,335 filed on Sep. 25, 2018 now U.S. Pat. No. 11,100,086 issued Aug. 24, 2021 and is related in subject matter to commonly-assigned U.S. patent application Ser. No. 15/457,837 filed Mar. 13, 2017; Ser. No. 15/276,455 filed Sep. 26, 2016 and Ser. No. 12/069,986 filed Feb. 13, 2008, each of which is incorporated herein by reference in its entirety.

BACKGROUND

The field of the embodiments disclosed herein includes distributed systems. Most storage systems that ingest content expose some facility to determine if the contents of ingested data appear to be locally correct or consistent. The concept of equivalency, however, is traditionally a local property with respect to each storage system.

DETAILED DESCRIPTION

Definitions

Distributed system: A distributed system comprises a collection of distinct, computing and/or storage processes and/or devices that may be spatially separated, and that may communicate with one another through the exchange of messages or events.

Replicated State machine: A replicated state machine approach is a method for implementing a fault-tolerant service by replicating servers and coordinating client interactions with server replicas. These state machines are "replicated" since the state of the state machine evolves in an ordered fashion identically at all learners. Replicas of a single server are executed on separate processors of a distributed system, and protocols are used to coordinate client interactions with these replicas. One example and implementation of a replicated state machine is a deterministic state machine that consumes its state in a deterministic manner.

Agreements: An agreement is a selected one of a potential plurality of proposal events generated by Proposers and delivered to Learners.

Global sequence of agreements: According to one embodiment, proposals are submitted to and agreed-upon by at least a majority of Acceptors and delivered in a global sequence of agreements. Server nodes receiving the global sequence of agreements may then execute the underlying transactions in the order specified by the global sequence of agreements and update their copy of the replicated ledger accordingly, thereby ensuring that all copies of the replicated ledger are updated in the same order.

Distributed agreement/co-ordination engine (DConE): One embodiment calls for an agreement or co-ordination engine to generate an ordered global sequence of agreed-upon transactions through a novel production-grade implementation of the Paxos consensus protocol. An exemplary DConE is described in commonly assigned U.S. application Ser. No. 12/069,986 filed on Feb. 13, 2008, which is incorporated herein by reference in its entirety. DConE is a fault-tolerant, continuously available and deterministic replicated state machine. DConE works by collecting events generated by Proposers, organizing them into an ordered global sequence with the help of Acceptors and delivering them in that sequence to Learners. The Learners implement their business logic by handling the ordered sequence of delivered events. DConE guarantees delivery of each proposal event at least once to each learner node in the same ordered global sequence of agreed-upon proposals.

Non-blocking: Herein, the term 'non-blocking' refers to the capability of a set of processes to remain fully or partly available while changes are made to that set.

Proposers: According to one embodiment, proposers are processes that are configured and enabled to suggest proposals, some of which may be configured to mutate data.

Acceptors: According to one embodiment, acceptors are processes that are configured to participate in deciding on the order of proposals made by proposers. According to one embodiment, only when a majority of acceptors have determined that a proposal takes a particular place in the global sequence of agreements does it become an agreement (e.g., an agreed-upon proposal). Acceptors, according to one embodiment, may be configured to only participate in deciding on the order of agreements and do not reason/care about the underlying contents of the agreements (as described herein, the agreement's value is opaque to the DConE). Acceptors may be configured as application-independent entities.

Learners: According to one embodiment, learners learn of agreements made between the proposers and acceptors and apply the agreements in a deterministic order to the application through their output proposal sequence. In one embodiment, an agreement identity is provided, as is a persistent store that, for each replicated state machine, allows a sequence of agreements to be persistently recorded. Each proposal is guaranteed to be delivered at least once to each Learner in a particular membership.

Membership: A membership specifies a set of nodes or processes, and the roles each plays within the specified set of nodes. According to one embodiment, a membership may comprise as a set of acceptors, a set of proposers and a set of learners.

Distributed Coordination Engine (DConE)

According to one embodiment, DConE implements an enhanced, enterprise version of the Paxos algorithm. Under the Paxos algorithm, a replicated state machine is installed with each node in the distributed system (herein, the term "node" refers to a logical or physical entity that can host and execute a process, e.g. a virtual machine or physical machine). The replicated state machines then function as peers to deliver a cooperative approach to agreement management that ensures the same order of agreements at every node—although not necessarily at the same time. The replicated state machines at the server nodes that implement the Paxos algorithm can fill one of any three roles: (1) Proposers; (2) Acceptors; and (3) Learners. There are three phases in the Paxos algorithm, which may be repeated during the process of reaching consensus: (1) election of a node to be the coordinator or Proposer; (2) broadcast of the transaction proposal to its peers that then assume the role of Learners, who either accept or reject the proposal; and (3) acceptance, once a majority of the nodes acknowledge the Proposer and accept its proposal, allowing consensus to be reached. The replicated state machine that assumed the role of coordinator then broadcasts a commit message to notify all of its peers to proceed with the transaction.

To avoid scenarios where multiple nodes try to act as coordinators for the same proposal, Paxos assigns an ordering to the successive coordinator nodes and restricts each coordinator's choice in selecting a value to be agreed upon for the proposal number. To support this, each node keeps track of the most recent agreed proposal sequence number that it has seen. When a node issues a proposal, it generates a sequence number for the proposal with a value higher than the last one it is aware of and broadcasts it to the other nodes. If a majority of the other nodes reply indicating they have not seen a higher sequence number, the node is then allowed to act as coordinator, or leader for the proposal. At this point, the other coordinators cannot proceed until consensus is reached on the current proposal. The proposer's sequence number cannot be used by other nodes attempting to be coordinator at the same time, and all future proposals must use a higher sequence number to achieve consensus for future transactions.

Achieving Consensus with DConE

In order to understand DConE's approach to distributed transaction processing, the following details the core components of each DConE instance that support its active-active replication capability: the proposal manager, the local sequencer, the agreement manager, and the global sequencer. When an agreement is submitted to the distributed system for processing by a customer at any node, the proposal manager component of the local instance of DConE generates a proposal that may include a command to mutate a piece of data. The DConE instance then assigns a local sequence number (LSN) to the proposal. The LSN reflects the order in which the transaction was submitted relative to all other agreements. The LSNs need not be consecutive numbers, merely unique. The local sequencer then saves the proposal with the assigned local sequence number to its proposal log. If a network or server outage occurs before the local instance of DConE is able to submit the proposal to its peers during the agreement process described below, it will resubmit that proposal after it recovers.

Next, DConE's agreement manager determines an agreement number, which represents a proposed global sequence number (GSN) for the proposal that the local DConE instance will submit to its peers at other nodes. In accordance with Paxos, the agreement number is simply an increment of the GSN of the last proposal accepted by all of the nodes. This agreement number is then used to obtain consensus about the ordering of the agreements across all of the nodes, so that one-copy equivalence is maintained. The proposal with the agreement number is then written to the agreement log. Each DConE instance's agreement log or replicated ledger contains at least all completed agreements, regardless of the server node at which the completed agreements originated. In the event of a network outage, the agreement log will indicate where the node left off before it lost its connection to the other nodes in the distributed system, making it useful during DConE's automated recovery process. The roles played in the recovery process by both the agreement log and the proposal log are described hereunder.

An agreement protocol is then initiated by the local DConE instance's agreement manager, and the proposal is submitted to its peers. Once a quorum of the DConE instance's peers reach agreement on the proposal, the agreement number is used as the GSN across all of the nodes as global transaction ordering has now been achieved. The quorum concept enables DConE to reach agreement without requiring that all nodes are available or agree. The quorum concept is a key element of DConE's performance as well as its fault tolerance. The quorum concept is also described hereunder.

If agreement is pre-empted by a competing proposal, the agreement manager repeatedly attempts to reach agreement with a new agreement number. Each time agreement is reattempted, an entry with the new agreement number is created in the agreement log. Once agreement is reached by a quorum, the local application node enqueues the agreed upon proposal in its global sequence. At this point the local DConE instance passes the transaction off to its respective locking scheduler for processing, in the agreed global sequence number order. It is important to note that the DConE instance where the proposal originated does not wait for any of the other nodes to complete execution of the transaction; it only waits for agreement to be reached, allowing users to experience LAN-speed performance.

Preserving the Local Sequence

Because DConE supports concurrent agreements for performance reasons, it is possible for the quorum to reach agreement out of order. That is, it is possible for an agreement to be reached on a proposal that was submitted after a prior-submitted and not yet agreed-upon proposal at another node.

Recall that DConE takes proposals from multiple server nodes, collates them into a unique global order and makes it accessible to every other server node. Sometimes it is desirable, for a given server node, to implement a first-come-first-served or First-in-First-Out (FIFO), process in handling of the proposals based on their time of arrival and make sure that they are output in the same order. This kind of ordering maybe mandated, for example, by a fairness policy or causal ordering constraint, which are two requirements that are met, according to one embodiment, by the capturing and reaching consensus on all proposals issued by the plurality of server nodes.

The following illustrates one embodiment that enables DConE to determine global transaction ordering while preserving the local sequence of submission of proposals. Assume that a server node submits its first two proposals to DConE and the proposal manager assigns LSN 1 and LSN 2 to the respective proposals. Assume further that a total of 25 proposals with GSNs 1 through 25 have been agreed, and no intervening proposals have been submitted by the other server nodes. Assume further that the quorum reached agreement on LSN 2 before reaching agreement on LSN 1. If local sequence didn't matter to the application, then LSN 2 would have agreement number and GSN 26, and LSN 1 would have agreement number and GSN 27. The proposals would then be written in that order at all of the server nodes. If the requirement is to ensure that local sequence is preserved at all of the nodes regardless of where the proposals originate, one embodiment uses a combination of the LSN, the agreement number, which in this case may or may not end up being the GSN, and the proposer ID, which represents a globally unique identifier for the DConE instance where the proposal originated, to construct a global sequence that preserves the local sequence order. In effect, the global sequence is sorted in local sequence order within proposer ID and passed to the locking scheduler, discussed hereunder, at each server node.

The Locking Scheduler

The locking scheduler at each server node that DConE passes agreed-upon proposals to the application running at each of the server nodes. The locking scheduler behaves like a database scheduler, not a distributed lock manager. The term "locking scheduler" comes from the fact that it relies on the locks specified by the application for concurrency control, so that large numbers of non-conflicting agreements can be processed in parallel. The locking scheduler is agnostic with respect to the global order. The order in which the locking scheduler submits transactions to the underlying application at each site is driven by a local queue of globally sequenced events (the GSN queue) passed to it from its respective DConE instance at that server node. This allows completely local locking schedulers at each server node to achieve one-copy equivalence without any knowledge of global state. It is the locking scheduler that interfaces with the underlying application, and not DConE directly.

Achieving Performance and Scalability

DConE significantly extends the functionality of the Paxos algorithm, thereby enabling enhanced performance at scale. Such extended functionality includes quorum, concurrent agreement handling, backoff and collision avoidance, dynamic group evolution, distributed garbage collection, distinguished and fair round numbers for proposals and weak reservations, to identify but a few areas encompassed by such extended functionality.

Quorum

The quorum concept used by DConE allows performance to be optimized and the impact of network and server outages to be minimized based upon the distribution of users across server nodes. The quorum configuration options that are available include majority, singleton and unanimous. It is anticipated that the distributed system will operate with consensus being achieved by majority quorum, although singleton and unanimous consensus are also possible. In majority quorum, a majority of the server nodes are required to respond to any proposal. DConE also supports the concept of a distinguished node that can act as a tie-breaker in the event that there is an even number of server nodes in the distributed system. With a singleton quorum, only one node has to respond to proposals. The server node selected to be the singleton quorum under this configuration may be that server node having the greatest number of customers and level of trading activity. The benefit is that no wide area network (WAN) traffic is generated during the agreement process at the server node with the highest transaction volume. Agreement is handled entirely by the local DConE instance at the quorum node. The other server nodes submit their proposals to obtain agreement from the singleton quorum node, but typically experience fast performance because they only require the designated singleton server node to agree to their proposals, not complete execution of them, before they hand them off to their respective local locking schedulers. Unanimous quorum requires all server nodes to respond and is inherently the least efficient configuration and the configuration that generates the most WAN traffic.

DConE also supports rotation of the quorum from one region to another based on a follow-the-sun model. This allows performance to be optimized on the basis of normal working hours at each site in a globally distributed system. In addition, the quorum approach works in combination with DConE's automated recovery features to minimize the impact of network outages and server crashes on a distributed system.

Concurrent Agreement

The Paxos algorithm only allows agreement to be reached on one proposal at a time. This has the obvious effect of slowing down performance in a high transaction volume environment. DConE allows multiple proposals from multiple proposers to progress simultaneously, rather than waiting for agreement to be reached by all or a quorum of the server nodes on a proposal by proposal basis.

Back-Off and Collision Avoidance

DConE provides a backoff mechanism for avoiding repeated pre-emption of proposers by their peers. Conventional replicated state machines allow the preempted proposer to immediately initiate a new round with an agreement number higher than that of the pre-emptor. This approach can lead an agreement protocol to thrash for an extended period of time and severely degrade performance. With DConE, when a round is pre-empted, the DConE instance which initiated the proposal computes the duration of back-off delay. The proposer then waits for this duration before initiating the next round. DConE uses an approach similar to Carrier Sense Multiple Access/Collision Detection (CSMA/CD) protocols for nonswitched ethernet.

Automated Backup and Recovery

DConE's active-active replication capability delivers continuous hot backup by default by turning every server node into a mirror of every other. This is leveraged to provide automated recovery over a WAN, or a LAN when a server node falls behind due to network or server failures. No manual intervention is required. If a server node in the distributed system loses contact with its peers, but is still available to users at its location, those users will still have read access to the distributed system but may not be allowed to issue proposals, as the agreement process cannot proceed. This prevents a split-brain scenario from arising that would result in the server node going out of sync with its peers, thus violating the requirement for one copy equivalence across all of the server nodes. However, proposals can still be submitted at the remaining server nodes, provided that a quorum is still available. This minimizes the impact of network outages and server failures on the distributed system. As soon as the failed server node comes back online, its DConE instance catches up automatically with all of the proposals agreed by its peers while it was offline. This is accomplished by using the agreement log. The agreement log contains the last completed at the server node before the outage occurred. When the recovery process begins, the server node's DConE instance requests all agreements after the last recorded in its agreement log from its peers. In addition, any proposals left in the proposal log that did not complete the agreement process are automatically resubmitted by the local DConE instance, once the catch-up is complete. This means that regardless of whether an outage occurs before or after agreement is reached on any proposals across the server nodes in a distributed system, no data will be lost.

In addition, DConE's automated recovery capabilities eliminate the need for disk mirroring solutions that only work over a LAN, not a WAN, and require administrator intervention to achieve recovery. As a result, these solutions can introduce the risk of extended downtime and data loss due to human error. Finally, DConE's automated recovery features also make it possible to take servers offline for maintenance without disrupting user access, since users can be redirected to a server node at another site while theirs is offline. This makes full 24-by-7 operation possible in a globally distributed environment.

Figure 1:
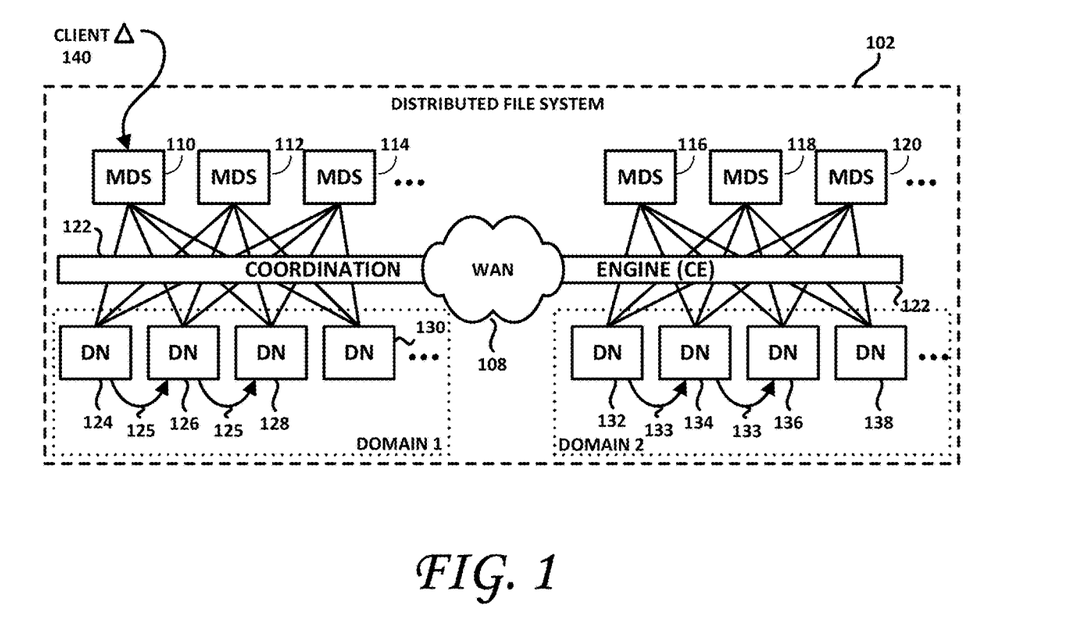
FIG. 1 is a block diagram of a system according to one embodiment.

FIG. 1 is a block diagram of components of a cluster and a distributed file system that spans a WAN, according to one embodiment. As shown therein, a distributed file and storage system 102 according to one embodiment, may comprise two or more domains; namely, domain 1 and domain 2. For example, domain 1 may include an Amazon AWS storage service and domain 2 may include, for example, a Microsoft Azure storage service. Domains 1 and 2 may be geographically remote from one another. For example, domain 1 and domain 2 may be located in different parts of a single country, may be distributed on different continents, different time zones and may draw from wholly independent electrical grids. Domains 1 and 2 may be loosely coupled to one another via a WAN 108 that may include, for example, the Internet and/or other private and/or proprietary networks. Domains 1 and 2 may also be coupled via other dedicated, high speed connections. Although only two such storage service domains 1 and 2 are shown in FIG. 1, it is to be understood that embodiments may include a greater number of domains and that the distributed file system 102 extends across all such domains.

As shown, domain 1 may comprise a plurality of active (as opposed to, for example, Standby or Failover) metadata servers (of which a Hadoop NameNode is but one possible implementation) denoted in FIG. 1 as "MDS" 110, 112, 114 and as MDS 116, 118 and 120. Each of the MDS 110, 112, 114 may be configured to store the state of the namespace within domain 1 and each of the MDS 116, 118, 120 may be configured to store the state of the namespace within domain 2 of the distributed file system. In an ideal world, the state of the namespace in domain 1 would be the same as the state of the namespace in domain 2, at any given GSN. Aspects of the coordination between MDSs and the maintenance of the namespaces may be provided by Distributed Coordination Engine (DConE) process 122. In FIG. 1, the DConE process 122 is shown in a manner that suggests it to be a separate logical entity spanning domain 1, domain 2 and the WAN 108. According to one embodiment, however, the functionality of the DConE 122, described above and hereunder, may be discharged by each of the MDSs 110, 112, 114, 116, 118 and 120. That is, each of the MDSs 110, 112, 114, 116, 118 and 120 may be configured, among its other functions, to carry out some or all of the duties of the DConE 122.

As shown, domain 1 may comprise a plurality of DataNodes 124, 126, 128, 130, referenced as "DN" in FIG. 1. Similarly, domain 2 may also comprise a plurality of DataNodes 132, 134, 136, 138, also referenced as "DN". As shown, each of the DataNodes 124, 126, 128, 130 may be coupled to and configured to communicate with each of the MDSs 110, 112 and 114 of DCA 102. As also shown, each of the DataNodes 132, 134, 136, 138 may be coupled to and configured to communicate with each of the MDS 116, 118 and 120 of DCB 106. Alternatively, the DNs 124, 126, 128, 130 may be considered to be, from the outside, a monolithic storage resource that is internally managed by the storage service (e.g., Amazon Web Services or AWS). Similarly, the DNs 132, 134, 136, 138 may also be considered to be a monolithic storage resource that is internally managed by the storage service (e.g., Azure or some other storage service). According to one embodiment, the MDSs may not communicate directly with the DataNodes. Indeed, according to one embodiment, the DataNodes may be configured to send requests to the MDSs, whereupon the MDSs issue commands to the DataNodes responsive to the received requests. Therefore, although the MDSs may be said to control the DataNodes, the DataNodes may be configured, according to one embodiment, to send requests to the MDSs in order to receive a command therefrom. Four DataNodes 124, 126, 128, 130 are shown in domain 1. Similarly, four DataNodes 132, 134, 136 and 138 are shown in domain 2. It is to be understood, however, that that domains 1 and 2 data may each comprise many more (e.g., thousands) data nodes than are shown in FIG. 1.

Although three MDSs 110, 112, 114 are shown as being provided within domain 1, a greater number of MDSs may be provided within domain 1. Similarly, although three MDSs 116, 118, 120 are shown as being provided within domain 2, a greater number of MDSs may be provided within DCB domain 2. For quorum purposes, the number of MDSs within a data center may be selected to be an odd number.

According to one embodiment, FIG. 1 shows a cluster running a single distributed file system spanning different geographically-separated domains. The distributed file system may, for example, incorporate aspects of HDFS. Each of the DataNodes may be configured to communicate (through DataNode-to-NameNode remote procedure call (RPC) protocol) only with MDSs within their own domain. Conversely, the MDSs of a data center may be configured to control only the DataNodes within their own domain. That is, the DataNodes of domain 1 may only, according to one embodiment, communicate with the MDSs associated with the domain 1 and the Data nodes of domain 2 may only communicate with the MDSs associated with domain 2.

According to one embodiment, the DConE process 122 may be configured to guarantee that the same deterministic updates to the state of the namespace are applied in the same deterministic order on all MDSs. According to one embodiment, that deterministic order is defined by Global Sequence Number (GSN). Therefore, a significant role of the DConE process 122, according to one embodiment, is to process the proposals to modify or otherwise update the state of the namespace from all MDSs and transform them into a globally-ordered sequence of agreements. The MDSs may then sequentially apply the agreements from that ordered sequence as updates to their stored state. According to one embodiment, the GSN may be configured as a unique monotonically increasing number. However, the GSN may be otherwise configured, as those of skill in this art may recognize. The GSN may then be used to compare the progress of different MDSs in updating the state of the namespace and keeping that namespace state consistent across MDSs (or bringing the state of the namespace stored in each of the MDS into consistency over time through the sequential application of the globally ordered sequence of agreements). For example, if MDS 110 has just processed an agreement numbered GSN1, which is smaller than GSN2 just processed by MDS 112, then MDS 110 has an earlier namespace state than does MDS 112. The state of the namespace stored by MDS 110 will match that stored by MDS 112 as soon as MDS 110 processes GSN2, provided that MDS 112 has not processed a higher-numbered agreement in the interim. In this manner and through the sequential execution of the ordered (though the GSN mechanism) set of agreements generated by the DConE process 122, the state of the namespace stored in each of the MDSs in each of the data centers is ideally brought to or maintained in consistency.

According to one embodiment, with each operation, clients learn about the latest GSN processed on the MDS to which the client is currently connected. Thereafter, if the client switches to another MDS it should, according to one embodiment, first wait (if necessary) until the new MDS catches up with the last GSN the client knows about (i.e., the GSN that the client received from the previously-accessed MDS) before issuing an RPC comprising a data access command such as a write. This will avoid the stale read problem. As MDSs start from the same state, this ordered application of updates implies consistency of the replicas, in that snapshots thereof taken on different nodes having processed the agreements at the same GSN are identical, both within and across data centers.

One embodiment coordinates all metadata between MDSs 110, 112, 114, 116, 118, 120 instantaneously (or nearly so, accounting for bandwidth and latencies inherent in the network), as the DConE process 122 delivers the agreements. Likewise, all file system data is also automatically replicated across the domains the cluster. One embodiment provides consistent, continuous data replication between file systems in (e.g., but not limited to, Hadoop) clusters. Client applications may be configured to interact with a virtual file system that integrates the underlying storage across multiple clusters. When changes are made to files in one cluster, those changes are replicated consistently to the other spanned clusters. One embodiment may comprise a software application that allows Hadoop deployments to replicate HCFS data between (e.g., Hadoop) clusters that are running different, even incompatible versions of Hadoop such as, for example, CDH, HDP, EMC Isilon, Amazon S3/EMRFS and MapR. It is also possible, according to one implementation, to replicate between different vendor distributions and versions of Hadoop.

Advantageously, embodiments provide a distributed virtual file system, a single, virtual namespace and WAN replication using active-active replication technology, delivering single-copy consistent data, replicated between storage service domains.

Embodiments may be configured to boost processing power in the cloud by transferring data to remote cloud services such as, for example AWS, a platform that offers on-demand compute power, database storage, content delivery and other functionality, to gain additional processing power when it's required.

Equivalence and Consistency Checks

As described and shown herein, embodiments are drawn to methods and distributed systems (and the functionality enabled thereby) for determining the equivalence of data in a distributed system composed of asynchronous processes of varying speeds and employing ordered actions through the application of a replicated state machine whose primary purpose is to replicate data across distinct homogenous or heterogenous storage systems. The embodiments herein enable a sustained monitoring of and equivalence checks on data, irrespective of the underlying storage system. Embodiments are composable throughout, facilitating application at scale. Equivalence may be determined with respect to some property, e.g. whether the checksum of the copied data matches its original counterpart. Distributed storage facilities like Apache HDFS generate checksums on data blocks, and use this information to determine consistency of block replicas. Amazon's Simple Storage Service (S3) permits the user to include metadata along with the data blob so that clients can confirm correct data receipt. Microsoft's Azure Storage has similar functionality. The methods by which data is observably equivalent may be defined by the client (in, e.g., S3), or by the system (in, e.g. Apache HDFS).

The embodiments shown and described herein include computer-implemented methods, device and systems for real-time (or as soon as possible) determination of violation of consistency invariants; that is, the checking of consistency of data across a distributed heterogenous storage system.

Herein, the terms equivalent or equivalence refer to the one copy equivalence property, in that all replicas are functionally equivalent copies of each other. That is, if two or more nodes start with identical copies of data and all changes to that data are applied in the same order to each copy, at the end of x number of transactions, the copies will all remain equivalent to one another. The embodiments described and shown herein enable consistency checks between environments that use otherwise incompatible storage systems, in which each system is able to read and write to their local copy of the same data without introducing inconsistency. Indeed, changes can be made to the local copy of the data in either environment without risking divergence. Embodiments, therefore, enable consistency checks at a global level across cloud and on-premises storage, to show one copy equivalence of user data across heterogeneous data storage systems.

The embodiments presented herein extend equivalency beyond a single storage system to introduce cross-storage system equivalency. Herein, the ordering properties of issuing mutations across distinct homogenous or heterogenous storage systems, based upon ordered instructions generated by a distributed state machine, are used to determine whether data ingested by one storage system and replicated distinct storage technology, is equivalent with respect to one or more storage system-generic or agnostic equivalency properties. Embodiments are composable and scalable, and are fully decoupled from the process issuing mutations.

Indeed, within the context of a large distributed system in a so-called big data environment, it is useful to be able to consistently determine if each copy of a data point is the same across multiple data repository sites. Herein, it is assumed that mutations to the data (e.g., writes, appends or prepends to the data) are ordered. That is, the same changes are imposed by the replication server(s) upon the same data in the same order across all data storage sites. That same order may be governed by a global sequence number (GSN) described above or by an equivalent mechanism. The data stored by one service (e.g., Amazon's AWS service) may not see the same mutations at the same time as a copy of that same data stored by another service (e.g., Microsoft Azure, for example), but the same changes are applied in the same order nonetheless, such that the copies of the data mutate in the same manner, albeit likely not at exactly the same time. Over time, should no further mutations be applied to the data (all agreements concerning that piece of data have been consumed), then the data will settle (remain unchanged) and be equivalent at both the AWS site and the Azure site.

Figure 2:
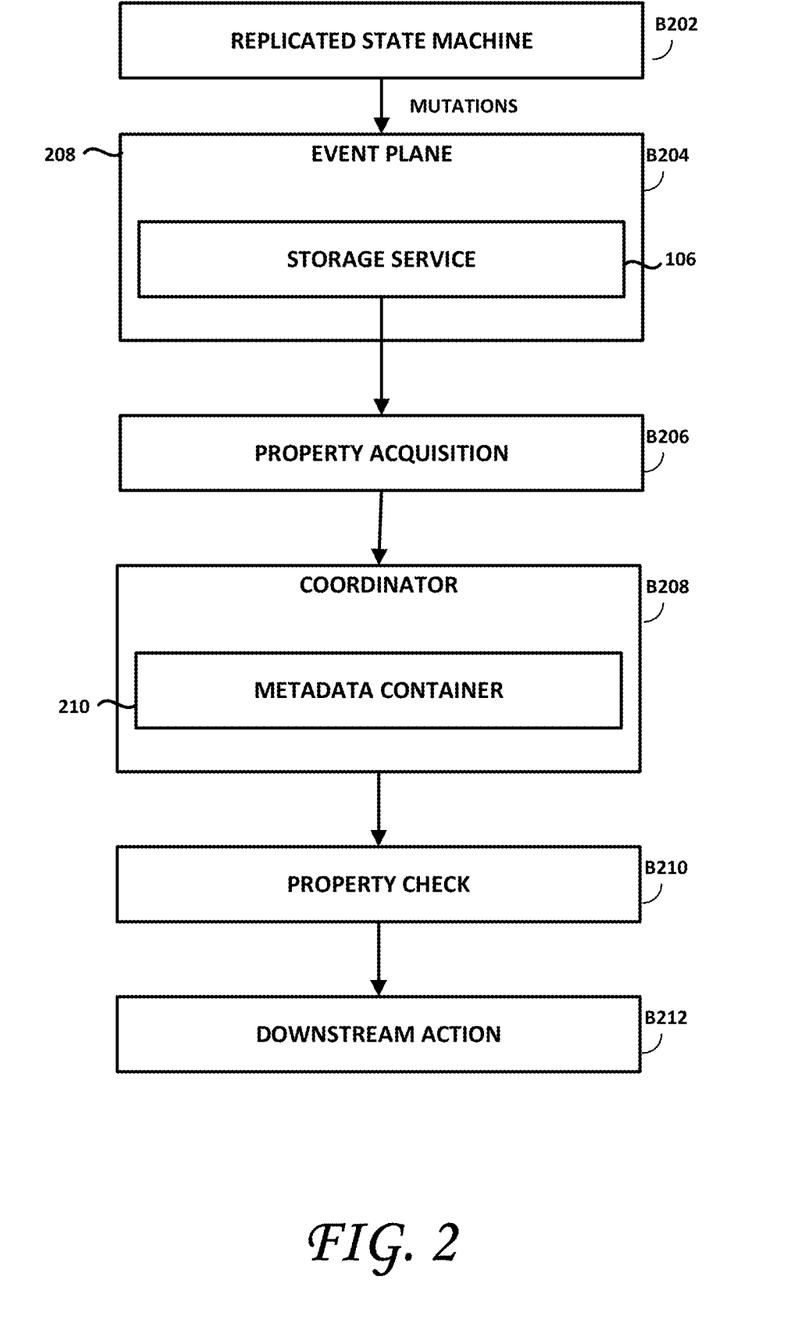
FIG. 2 is a flowchart illustrating aspects of a computer-implemented method according to one embodiment.

FIG. 2 shows aspects of a computer-implemented method of checking the consistency of data according to one embodiment. As shown therein, B202 shows a replicated state machine, which consumes agreements, some of which may mutate the data stored in one or more storage services 206. Each storage service 206 may comprise some facility to observe the effect of the mutations of the stored data by the replicated state machine at B202 and issue corresponding notifications. Such facility is represented in FIG. 2 at event plane 208. In Amazon AWS, for example, such facility may be provided, among others, by AWS Cloudtrail. Cloudtrail is an AWS service that enables governance, compliance, and operational and risk auditing of an AWS account. Actions taken by a user, role, or an AWS service are recorded as events in CloudTrail. Events include actions taken in the AWS Management Console, AWS Command Line Interface, and AWS SDKs and APIs. When activity occurs in an AWS account, that activity is recorded in a CloudTrail event. Recent events may be viewed in the Event History in the CloudTrail console. For an ongoing and persistent record of activity and events in an AWS account, a trail may be created. CloudTrail enables users or processes to view, search, download, archive, analyze, and respond to account activity across an AWS infrastructure. The trail may be configured to identify, through metadata, who or what took which action, what resources were acted upon, when the event occurred, among other details. The record of events is customizable, by appropriately setting trail settings. As events occur, the trail settings are evaluated to determine whether the events match the trail settings. Only events that match pre-existing trail settings are logged.

Trails may be configured to log both data and management events. Data events provide insight into the resource operations performed on or within a resource. These are also known as data plane operations. Management events provide insight into management operations that are performed on resources in an AWS account. These are also known as control plane operations. Both data plane and control plane operations are represented in FIG. 2 as event plane 208.

Similarly, Microsoft Azure also provides both data plane logs and control/management logs. Data plane logs such as Azure diagnostic logs provide information about events raised as part Azure resource usage. Examples of this type of log are the Windows event system, security, and application logs in a virtual machine (VM) and the diagnostics logs that are configured through Azure Monitor. Control/management logs provide information about Azure Resource Manager CREATE, UPDATE, and DELETE operations. Such logging facility is also represented in FIG. 2 as the event plane 208. Diagnostic settings in Azure enable the resource logs to be configured as desired.

Whether originating from AWS, Azure of some other storage service or services, the event plane 208 may be configured to enable the user to observe the data stored on the service and the changes made to such data. For example, the logging functionality of the storage service may be configured to log, among other possible events, the creation of data, the opening or closing of a file, the moving of a file, a write operation, a delete operation and/or any other operation that affects the data that is being monitored for consistency across storage services. In one embodiment, the event plane 208 of each storage service may be configured to generate and send notifications of selected events related to the underlying storage.

Property acquisition is shown in FIG. 2 at B206. According to one embodiment, the property acquisition B206 may be configured to query (and/or receive notifications from) the underlying storage service's logging service to acquire selected pieces of information regarding the stored data. For example, the property acquisition block B206 may be configured, for example, to query an S3 bucket that stores selected metadata. An Amazon S3 bucket is a public cloud storage resource that is available in AWS' Simple Storage Service (S3), an object storage offering. Amazon S3 buckets, which are similar to file folders, store objects, which consist of data and its descriptive metadata. Such metadata may include, for example, data size, name, checksums, user permissions and the like. Note that the metadata retrieved from the S3 bucket or other metadata repository or log of some other data service may be configured, according to one embodiment, to be agnostic to the underlying storage. That is, the metadata retrieved by the property acquisition block B206 may not include any storage service-specific metadata, thereby enabling the metadata of data stored on one storage service (such as AWS, for example) to be readily and meaningfully compared with the metadata of data stored on some other storage services (such as Azure or any other service). For example, the property acquisition block B206 may retrieve (or receive notifications regarding) selected metadata from an AWS S3 bucket and retrieve (or receive) similar metadata from Microsoft Azure's Blob, which is a streamed storage service similar to S3. Other similar storage services include, for example, Google Cloud, in which Cloud Pub/Sub receives and sends notifications about changes to monitored data objects, including the event and the object affected by the event. In any case, the property acquisition block B206 may be configured, according to one embodiment, to collect metadata of a data object that was affected by a selected event or events, from two or more storage services. According to one embodiment, the property acquisition block B206 may be partitioned across namespaces, such that the property acquisition block B206 is distributed across two or more nodes. Each component of the property acquisition block B206 may, therefore, be delegated to a predetermined or selected partition of the data storage system. In one embodiment, partitioning may also be dynamic and any component of the property acquisition block B206 may be delegated to one or more partitions of the underlying storage on the fly. The frequency at which the property acquisition B206 queries the underlying storage services or receives notifications from the event plane 208 may be selectable. For example, metadata may be collected for consistency checks upon each write and/or each time a data point (object, block, predetermined amount of data) is closed, at regular or predetermined time intervals and/or upon satisfaction of predetermined criteria. The granularity of the notifications or the frequency of the queries of the underlying storage services may define, therefore, the number of times and/or frequency at which the consistencies checks may be carried out, according to embodiments. The consistency checks, therefore, may be substantially regularly spaced or may be carried out upon the occurrence of a predetermined event-such as the closing of a data point and the settling of mutations on that data point across storage services.

A coordinator block B208 may be provided to receive notifications concerning the collected metadata from the several storage services from the event plane B204. According to one embodiment, the coordinator block B208 synchronizes between multiple instances of the distributed storage systems or services, to enable meaningful comparisons to be made between data residing in disparate cloud environments. In one embodiment, such synchronization may be carried out using the global sequence number or GSN, or some other ordering mechanism governing the ordered mutations to data across a distributed system. In one embodiment, the coordinator in block B208 may be configured to determine when the disparate storage systems (AWS, Azure and the like) have performed a predetermined mutation on predetermined data. In one embodiment, the predetermined mutation may be identified by a GSN. That is, the coordinator B208 may be configured to determine when all of the storage systems that store an instance of a particular piece of data have finished performing the mutation called for by a selected GSN- and have not since mutated that piece of data again. Indeed, if all storage services that store a copy of a particular piece of data have all performed a predetermined mutation on that piece of data, the storage service-agnostic metadata collected by the property acquisition block at B206 may be meaningfully compared with one another to determine equivalence or non-equivalence of the underlying data; that is, whether the data is the same across storage systems. In one embodiment, each mutation may be tagged with the associated GSN, thereby enabling the coordinator block B208 to readily determine whether the data on each storage service has been mutated by the operation to which the GSN is associated. A record of the GSN may, therefore, be resident on the storage service.

Storage services such as AWS, Azure, Google Cloud necessarily operate at different speeds. The coordinator B208, which receives the storage service-agnostic metadata from the property acquisition block B206, may be configured to wait until all storage services that store and mutation a copy of a piece of data have all performed the same mutation on that same piece of data. Indeed, due to the application domain, the different speeds at which the different storage services operate must be taken into account. To do this, the state machine-issued identity of the mutation (in one implementation, the GSN) may be used. For example, assume that one storage service process has issued a sequence of writes (x, 0), (x, 1), where the first component of the tuple is the subject of the mutation and the second component of the tuple is the identity issued to the mutation by the state machine, and another storage service has issued (x, 0). Under this scenario, it may be observed that the former storage service is making greater progress (e.g., is processing agreements faster) than the latter storage service. In such a case, attempting to compare properties or metadata on x at a time where the first storage service has executed (x,0) and (x, 1), whereas the second storage service has only executed (x, 0) would not yield any useful information regarding equivalence. Therefore, to enable meaningful comparison of the metadata associated, it makes sense to wait until the mutations on x stabilize across storage services. In this context, stabilization or the settling of a data point x may be said to exist when there exists no mutation on x such that an active process (in one storage service, for example) has observed a sequence of mutations that exceed one or more other processes (in another storage service, for example), as determined by the coordinator B208. In one embodiment, to reduce the number of false positives (such as when a particular piece of data has briefly stabilized across several storage services, but is thereafter mutated), the universe of mutations that trigger the event plane 208 to generate and the property acquisition to receive, the associated metadata may be limited. Indeed, rather than fine-grained actions on the data such as writes and appends, the coordinator may determine that the data has stabilized only after, in one embodiment, a close operation has been carried out, tagged by a machine-issued identity such as a GSN, on the data at each of the storage services. Doing so reduces the overhead associated with the consistency checks including, for example, latency, storage of metadata, computational load and network traffic.

It is the goal of one copy equivalence that once each storage service has performed the same series of mutations on a piece of data, the data will be in the same state in each of the storage services, with any one copy of the data in one storage service being equivalent to any and all other copies thereof stored in other storage services, given a deterministic system, identically-ordered mutations and the same initial conditions. Therefore, if the coordinator at B208 receives storage service agnostic metadata associated with a particular state of the data (as determined by a selected GSN, for example) from each of the storage services, the metadata from each of the storage services may be compared to determine equivalence of the copies of the underlying data. To do so, the metadata from each of the storage services storing an instance of the data at a given state machine-issued identity of the mutation (a selected GSN or other ordering mechanism, for example) may be stored in the coordinator B208's metadata container 210, to be compared by the property check block at B210. Note, however, that not all state machine-issued identities (GSN or other) are associated with a mutation of a data point. Indeed, some are unrelated to changes to data and are, instead, related to other housekeeping issues that do not result in a mutated data point. In such a case, metadata may be collected even though one namespace may be at one GSN and another namespace may be at another, different GSN, provided the underlying stored data has settled at a given state machine-issued identity.

Property check B210, according to one embodiment, may be configured to check the equivalence of the underlying data by comparing the storage service agnostic metadata stored in the metadata container 210. For example, assume that file A, stored in AWS, is written to at a particular GSN and that the same file A, stored in another storage service such as Azure, was also written to at the same particular GSN—but not necessarily at the same time the instance of file A stored in AWS was written to by the operation associated with that GSN. Once the coordinator B208 determines that both AWS and Azure have finished mutating file A by the operation associated with the aforementioned particular GSN and, in one embodiment, have not further mutated file A beyond that called for by that particular GSN, the metadata associated with file A may be stored in the metadata container 210, whereupon that stored metadata may be used to determine equivalency of the different instances of file A (stored in AWS and Azure in the example being developed here). Embodiments of the property check B210 may be configured to compare, for example, block size, file name, file size, user name, permissions, checksums and/or any other metadata generated by the storage services, collected by the property acquisition module B206 and stored in metadata container 210, to enable it to determine, with a high level of confidence (e.g., certainty or near certainty) that the associated copies of the data on the different storage services are indeed the same (i.e., equivalent). According to one embodiment, the metadata collected and used for the comparison may be configurable to suit the application at hand. Indeed, depending upon the application domain, the user or owner of the data may be less important or useful to the equivalency determination than, say, the checksum or other property or metadata.

Lastly, the result of the property check (i.e., equivalent or not equivalent) may be communicated to the owner or user of the data for some downstream action, as suggested at B212. For example, the result of the equivalency may be logged, to provide a running, persistent history of equivalency checks. In one embodiment, as long as the result of the comparison carried out by property check B210 indicates equivalency, nothing further need be done beyond, perhaps the logging of the results of the consistency check—if desired. If, however, the property check reveals non-equivalency (the compared metadata are dissimilar in some meaningful way, indicating that the underlying data may likely be dissimilar), the downstream action B212 may require some remedial or other action. Such actions may include, for example, rolling back the state (as determined by the GSN or other ordering mechanism) of the piece of data stored at one or more storage services to a previous state where the property check indicated equivalency. This enables the operations associated with subsequent GSNs to be re-executed, presumably bringing the previously anomalous and dissimilar data back into equivalency with the other instances of that data stored on other storage services. Another possible action may include, for example, invalidating one or more copies of the data and replacing the invalidated data with data deemed to be valid. Other actions are possible.

For example, another possible downstream operation at B212 is to select, arbitrarily or otherwise, which instance of the data is the "correct" version of that data. For that, one embodiment calls for a prior selection of one of the storage instances being the "source of truth". That is, the storage service having been designated as the source of truth may be considered to have the correct data, and the instance of instances of non-equivalent data stored in other storage services may be simply replaced with the version thereof stored in the storage service designated as the source of truth. The source of truth may alternatively be dynamically determined. If AWS is designated as the source of truth, according to one embodiment, the data stored on AWS may be read and written to Azure, replacing the non-equivalent corresponding piece of data stored therein, thereby bringing cross-storage service equivalency back, at least for the particular piece of data for which the respective associated metadata was compared. Other actions are possible. As such actions may be different in different application contexts, the exact nature of such remedial or downstream actions are beyond the scope of the described embodiments.

Mutability/Immutability

Some storage services may offer immutable storage services, while other storage services may offer mutable storage services. Some may offer both. Regulated financial services organizations, healthcare organizations, legal organizations, to name but a few, may be required to retain business-related data in an immutable state that makes it non-erasable and non-modifiable, at least for a predetermined retention interval. For other organizations or purposes, mutable data is the norm. Other uses for immutable data include, for example, storage is used for tertiary and off-line storage. Among other advantages, immutable data storage systems may enable the data to be rolled back to an earlier, documented state. Mutable data, as the name implies, may be changeable; that is, mutated or overwritten at any time. Examples of mutable data may include sensor data that is repeatedly overwritten as new data points are acquired and/or any other application that does not require persisting the data for predetermined periods of time. For instance, both AWS and Azure storage Blobs offer both mutable and immutable data storage services. HDFS, for example, is mutable, in that only one version of the data is available at any given time.

The mutable/immutable properties of the storage services may affect when the property check B210 may compare metadata associated with data stored on separate storage services. If the storage services are all immutable, the metadata associated with data points stored therein may be checked to determine current equivalency (even equivalency at some past predetermined state) at any time, provided that all storage services have each processed the same state machine-issued identity (e.g., GSN) at which the equivalency check is to be performed. If the storage services are all mutable, it is necessary to allow the data whose metadata is to be compared to settle, such that no one storage services has processed a command to mutate the data that is associated with a state machine-issued identity that is greater than the last state machine-issued identity it has processed. In a heterogenous distributed system comprising both immutable and mutable data storage services, the limiting factor in the timing of the property check at B210 may be, according to one embodiment, whether the data in the mutable data storage service has settled or stabilized long enough to allow the property acquisition B206 to at least acquire the metadata, thereby enabling the coordinator B208 to determine synchronization and the property check B210 to meaningfully compare the collected and stored metadata.

According to one embodiment, therefore, for heterogeneous systems comprising mutable storages and for distributed systems comprising only mutable storage services (e.g., AWS, HDFS), the coordinator B208 may be configured to wait until all the data of interest on all mutable storage services has settled (not changed for a sufficient amount of time) before acquiring the metadata from property acquisition B206 and placing the acquired metadata in the metadata container 210. Therefore, the mutable storage services potentially are the limiting factor in how often the property check at B210 may be carried out, as the data of interest stored in all mutable storage services must settle before the property check at B210 may determine consistency of the data across storage services.

All mutations of data stored at the potentially heterogeneous (e.g., both mutable and immutable) storage services are ordered, e.g. via replicated state machine B202. However, this ordering property can be partitioned across namespaces. The event plane B204 observes and publishes mutations to the storage under observation in a sequence that preserves the ordering of mutations that the state machine dictated, with a partitioned application being an ordering over individual namespaces rather than the global namespace. Upon receipt of a notification from the event plane B204, the property acquisition B206 acquires the relevant information from the storage to facilitate checking of the metadata by the property check B210, which metadata is placed in the metadata container 210. According to one embodiment, subsequent processing may only occur when all active participants in the process have published their metadata for the same mutation, each distinguished, according to one embodiment, by the distinct, totally ordered, strictly increasing monotonic value (the GSN, in one embodiment) the state machine attached to the respective mutation. In other embodiments, the state machine-issued identity may be a strictly and monotonically decreasing value and, in others, may be configured differently. When all active participants have published their metadata for a particular mutation, the property check B210 asserts that the configured properties are true for the composed view of the mutation, publishing the result of this process to a downstream consumer.

In this manner, one embodiment determines and ensures the continued equivalence of data in a distributed system composed of asynchronous processes of varying speeds, employing ordered actions, e.g. by application of a replicated state machine, where the primary purpose is to replicate data across distinct homogenous or heterogenous storage systems. Embodiments, therefore, enable a constant monitoring of data in a polycloud environment, irrespective of the underlying storage system, and enable equivalence checks on that data. The presented technique is composable throughout, facilitating application at scale. Indeed, components of embodiments (e.g., at least the event plane and the property acquisition) may be delegated to separate namespaces and partitions of the underlying storage.

Significantly, the consistency checks shown and described herein may be carried out, according to one embodiment, without requiring the data services to stop or even slow down its process of acquiring, changing and logging data. Indeed, the asynchronous consistency checks shown and described herein may be carried out without interrupting the storage processes at each of the storage services from which the storage service-agnostic metadata is collected. The coordinator B208, as described above, ensures that the metadata associated with the data under observation has settled at a particular state across storage services, without requiring any of the storage services to delay making changes to their copy of the data.

Figure 3:
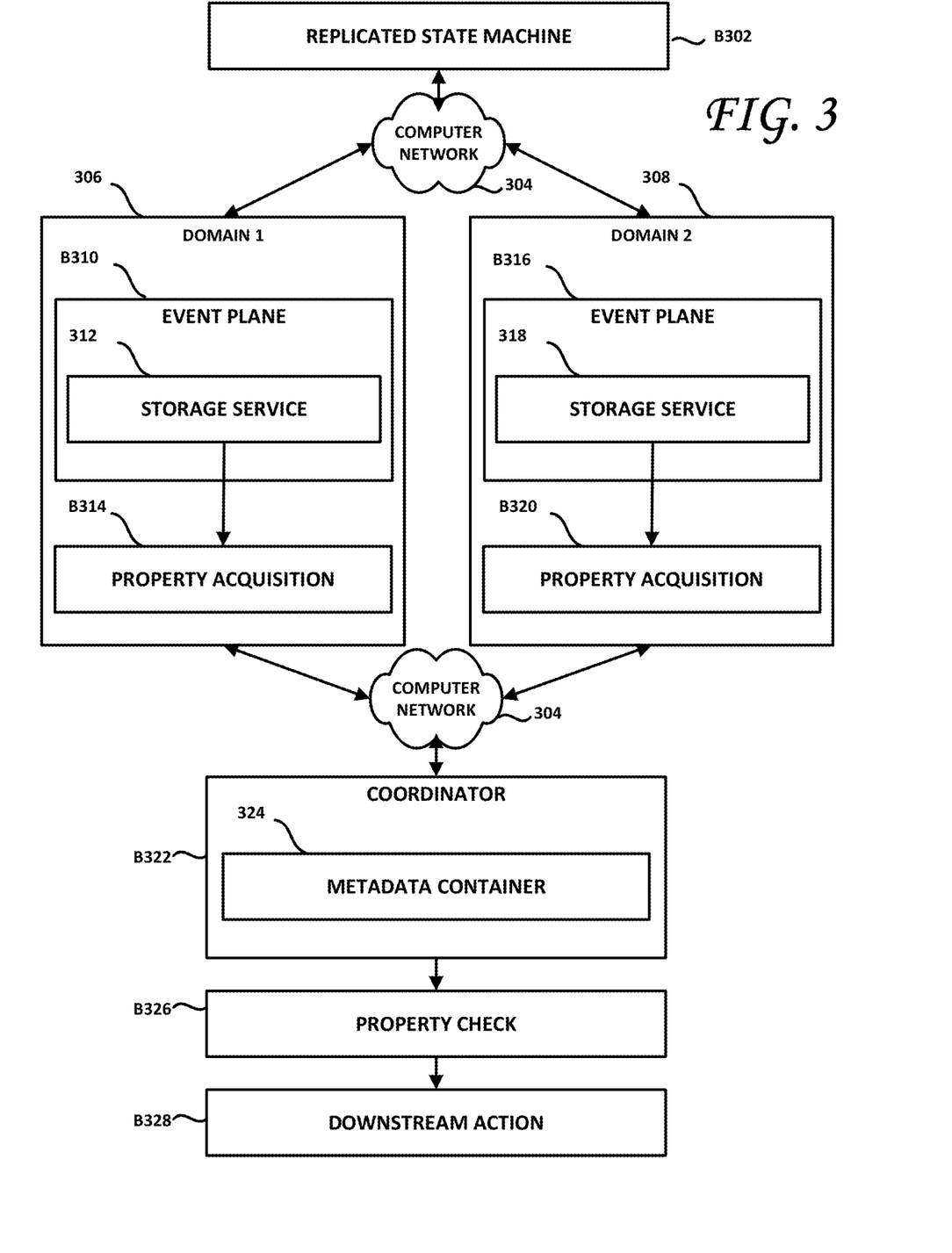
FIG. 3 is a flowchart illustrating aspects of a computer-implemented method according to one embodiment.

FIG. 3 shows further aspects of a computer-implemented method of checking the consistency of data across distributed and potentially heterogeneous storage services, according to one embodiment. As shown therein, B302 shows a replicated state machine, which consumes ordered agreements (provided to it by a Distributed Coordination Engine, for example), some agreements of which may include data-mutating operations to mutate the data stored storage services (shown in FIG. 3 as domains 1 and 2 at reference numbers 306 and 308) over a computer network 304. For example, domain 1 may include AWS storage services and domain 3 may include Azure storage services. In such an implementation, the ordered agreements are applied to data stored at both immutable (AWS or HDFS, for example) and immutable (Azure).

As shown, replicated state machine B302 may consume agreements received from some external source, some of which may be configured to mutate data stored in both domain 1 and in domain 3. Each storage service 306 and 208 may comprise an event plane B310, B316 configured to observe the effect of the mutations of the stored data by the replicated state machine at B302 and issue corresponding notifications. Each of the event planes B310, B316 may be configured to observe the data stored on its respective storage service and the mutations or changes made to such data stored in its respective storage service. In one embodiment, the event plane B310 of domain 1 and the event plane B316 of domain 2 may be configured to generate and send (or make available) notifications of selected events related to the underlying storage to the property acquisition B314 and B320, respectively. As shown in FIG. 3, at least some of the modules presented herein may be composable, to facilitate deployment of embodiments at scale. Indeed, as shown in FIG. 3, the event planes B310, B316 and the property acquisition blocks B314, B320 may be partitioned to separate namespaces and partitions of the underlying storage.

The property acquisition components B314 and B320 may each be configured to query (and/or receive notifications from) the underlying storage service's logging service to acquire selected pieces of information regarding the stored data. For example, the property acquisition block B314 may be configured, for example, to query or receive notifications from an S3 bucket that stores selected metadata, whereas property acquisition component B320 may be configured to query or receive metadata-containing notifications from, for example, Azure's Blob, Google Cloud's Pub/Sub and/or other services. In any event, each of the property acquisition blocks B314 and B320 may be configured, according to one embodiment, to collect metadata of data object stored on disparate and potentially geographically-separated storage services that were affected by a selected data-mutating event or events. The frequency at which the property acquisition components B314 and B320 query or receive notifications from the underlying storage services or received notifications from the event plane 108 may be predetermined or may be fully selectable. For example, metadata in each domain may be collected for consistency checks upon each write and/or each time a data point (object, block, predetermined amount of data) is closed, at regular or predetermined time intervals and/or upon satisfaction of predetermined criteria. The granularity of the notifications or the frequency of the queries of the underlying storage services may define, therefore, the number of times and/or frequency at which the consistencies checks may be carried out, according to embodiments. The consistency checks, therefore, may be substantially regularly spaced or may be carried out upon the occurrence of a predetermined event —such as the closing of a data point and the settling of mutations on that data point across domains.

Notifications concerning the collected metadata from the storage services in domains 1 and 2 may be sent by the property acquisition components B314 and B320 over a computer network 314 and may be received by a coordinator block B322. According to one embodiment, as the coordinator B322 necessarily coordinates between domains, the coordinator block B322 may not be composable. In other embodiments, aspects of the coordinator B322 may be distributed across domains and may be configured to message one another to determine whether a particular piece of data has settled, to enable a consistency check to be carried out thereon. As shown in FIG. 3, according to one embodiment, the coordinator block B322 synchronizes between the instances of the distributed storage systems or services in domains 1 and 2, to enable meaningful comparisons to be made between data residing in these disparate cloud environments. In one embodiment, such synchronization may be carried out using the global sequence number or GSN, or some other ordering mechanism governing the ordered mutations to data across a distributed system. In one embodiment, the coordinator in block B322 may be configured to determine when the storage services 312, 318 have performed a predetermined mutation. In one embodiment, the predetermined mutation may be identified by a GSN. That is, the coordinator B322 may be configured to determine when all of the storage systems 312, 318 that store a replica of a particular piece of data have finished performing the mutation called for by a selected GSN or other machine-issued identity. Indeed, if both storage services 312, 318 that store a copy of a particular piece of data have performed a predetermined mutation on that piece of data, the storage service-agnostic metadata collected by the respective property acquisition blocks at B314 and B320 may be meaningfully compared with one another to determine equivalence or non-equivalence of the underlying data; that is, whether the data is the same across the cloud storage services 312, 318. In one embodiment, each mutation may be tagged with the associated GSN, thereby enabling the coordinator block B322 to readily determine whether the data on each storage service has been mutated by the operation to which the GSN is associated. A record of the GSN may, therefore, be resident on each of the storage services 312, 318.

The storage services 312, 318 are unlikely to operate in lockstep, processing the same mutations at the same time. The coordinator B322, which receives the storage service-agnostic metadata from the property acquisition blocks B314 and B320, may be configured to wait until the storage services 312, 318 that store and mutation a copy of a piece of data have all performed the same mutation on that same piece of data. In one embodiment, the GSN associated with each mutation may be used to determine when and whether the data has settled or stabilized.

Property check B326, according to one embodiment, may be configured to check the equivalency of the underlying data by comparing the storage service agnostic metadata stored in the metadata container 324 of coordinator B322. Embodiments of the property check B326 may be configured to compare, for example, block size, file name, file size, user name, permissions, checksums and/or any other metadata generated by the storage services 312, 318, collected by the property acquisition modules B314, B320 and stored in metadata container 324 of coordinator B322, to enable the coordinator B322 to determine whether the associated copies of the data resident on the different storage services 312, 318 are indeed the same (i.e., equivalent). As also shown in FIG. 3, the result of the property check (i.e., equivalent or not equivalent) may be communicated to the owner or user of the data for some downstream action, as suggested at B328. Such actions may include, for example, rolling back the state (as determined by the GSN or other ordering mechanism) of the piece of data stored at one or more storage services back to a previous state where the property check indicated equivalency. This enables the operations associated with subsequent GSNs to be re-executed, presumably bringing the previously anomalous data back into equivalency with the other instances of that data stored on other storage services. Another possible action may include, for example, invalidating one or more copies of the data and replacing the invalidated data with data deemed to be valid. Other actions are possible.

For example, a possible downstream operation at B328 may include to select, arbitrarily or otherwise, which instance of the data is the "correct" version of that data. For instance, the "source of truth" may be the storage service 312. That is, the storage service 312 may have been designated as the source of truth and may be considered to have the correct data, and the instance non-equivalent data stored in another storage service (such as shown at 318 in FIG. 3) may be simply replaced with the version thereof stored in the storage service 312. FIG. 3, therefore, shows two domains with potentially distinct storage systems being observed for mutations, using the coordinator B322 as the arbiter of when metadata associated with data stored on disparate storage services may be compared for consistency.

Significantly, embodiments enable composition and consequently partitioning and application to any storage system that is observable and whose mutations are ordered with respect to an orchestration technology, e.g. state machine replication. Embodiments feature scalability to big data deployments that replicate produced data across distinct homogenous or heterogenous storage systems.

Embodiments may be event-based; that is, selectively triggered upon the occurrence of create, append and/or close requests. This approach facilitates a large throughput of accurate consistency checks that may only taking place when the data in question has stabilized on their respective observed sequences, partitioned, at the granularity of a single data point. Embodiments are particularly suited to systems that perform mutations to random points within the storage system, although embodiments are also applicable to long running mutations but at the cost of delayed results, as may be the case when consistency checks only occur upon occurrence of a "close" event.

Figure 4:
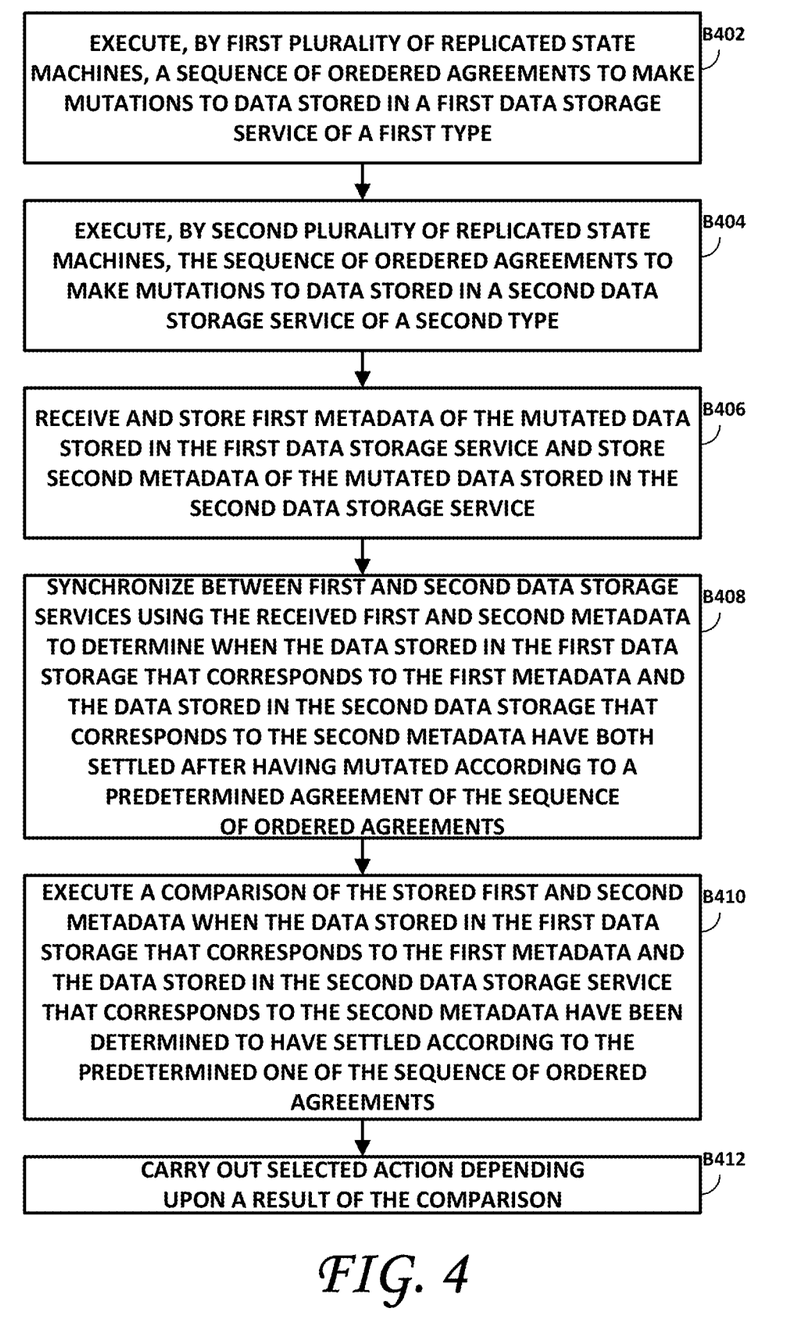
FIG. 4 is a is a flowchart illustrating aspects of a computer-implemented method according to one embodiment.

FIG. 4 is a flowchart of a computer-implemented method according to one embodiment. As shown therein, block B402 calls for executing, by a first plurality of replicated state machines, a sequence of ordered agreements to make mutations to a data stored in a first data storage service of a first type. Similarly, block B404 calls for executing, by a second plurality of replicated state machines, the sequence of ordered agreements to make mutations to the data stored in a second data storage service of a second type. As shown in block B406, first metadata of the mutated data stored in the first data storage service may be received and stored, as may second metadata of the mutated data have stored in the second data storage service. As shown in block B408, a synchronization may be carried out, as between the first and second data storage services using the received first and second metadata, to determine when the data stored in the first data storage service that corresponds to the first metadata and the data stored in the second data storage service that corresponds to the second metadata have both settled or stabilized (e.g., not changed for a selected amount of time) after having mutated according to a predetermined one of the sequence of ordered agreements. Then, as shown at B410, a comparison of the stored first and second metadata may be executed when the data stored in the first data storage service that corresponds to the first metadata and the data stored in the second data storage service that corresponds to the second metadata have been determined to have settled according to the predetermined one of the sequence of ordered agreements. As shown at B412, a selected action may then be carried out, depending upon a result of the comparison.

According to further embodiments, the sequence of ordered agreements may be ordered using a unique and strictly ordered global sequence number. The computer-implemented method may also comprise receiving, by the first plurality of state machines and by the second plurality of state machines, the unique and strictly ordered global sequence number from a distributed coordination engine or other appropriate source of mutation-ordering indicia. In one embodiment, the first type of the first data storage service may be either mutable or immutable, as may be the second type of the second data storage. In one embodiment, any of the first and second data storage services may be homogeneous or heterogeneous. The computer-implemented method may further comprise designating the first data storage service as a source of truth, such that data stored therein is considered to be valid. Indeed, when the comparison of the stored first and second metadata indicates that the data stored in the second data storage service that corresponds to the second metadata is inconsistent with the data stored in the first data storage service that corresponds to the first metadata, the selected action may comprise replacing the data stored in the second data storage service that corresponds to the second metadata data with the data stored in the first data storage service that corresponds to the first metadata. Synchronizing to determine when the data stored in the first and second data storage services have both settled may comprise waiting for a close operation to have been carried out on the data. In one embodiment, at least some of the previously-described steps or functionalities may be composable across at least the first and second data storage services and/or computing devices or processes external thereto.

One embodiment may comprise a computing device, comprising a memory; a processor, and a plurality of processes spawned by the processor, the processes being configured to enable consistency checks across storage services. The plurality of processes may comprise processing logic to execute, by a first plurality of replicated state machines, a sequence of ordered agreements to make mutations to a data stored in a first data storage service of a first type; execute, by a second plurality of replicated state machines, the sequence of ordered agreements to make mutations to the data stored in a second data storage service of a second type; receive and store first metadata of the mutated data stored in the first data storage service and receiving and storing second metadata of the mutated data stored in the second data storage service; synchronize between the first and second data storage services using the received first and second metadata to determine when the data stored in the first data storage service that corresponds to the first metadata and the data stored in the second data storage service that corresponds to the second metadata have both settled after having mutated according to a predetermined one of the sequence of ordered agreements; execute a comparison of the stored first and second metadata when the data stored in the first data storage service that corresponds to the first metadata and the data stored in the second data storage service that corresponds to the second metadata have been determined to have settled according to the predetermined one of the sequence of ordered agreements; and carry out a selected action depending upon a result of the comparison.

Yet another embodiment is a non-transitory machine-readable medium having data stored thereon representing sequences of instructions which, when executed by a computing device, cause the computing device to check a consistency of data stored at homogeneous or heterogenous data storage services by: executing, by a first plurality of replicated state machines, a sequence of ordered agreements to make mutations to a data stored in a first data storage service of a first type; executing, by a second plurality of replicated state machines, the sequence of ordered agreements to make mutations to the data stored in a second data storage service of a second type; receiving and storing first metadata of the mutated data stored in the first data storage service and receiving and storing second metadata of the mutated data stored in the second data storage service; synchronizing between the first and second data storage services using the received first and second metadata to determine when the data stored in the first data storage service that corresponds to the first metadata and the data stored in the second data storage service that corresponds to the second metadata have both settled after having mutated according to a predetermined one of the sequence of ordered agreements; executing a comparison of the stored first and second metadata when the data stored in the first data storage service that corresponds to the first metadata and the data stored in the second data storage service that corresponds to the second metadata have been determined to have settled according to the predetermined one of the sequence of ordered agreements; and carrying out a selected action depending upon a result of the comparison.

Physical Hardware

Figure 5:
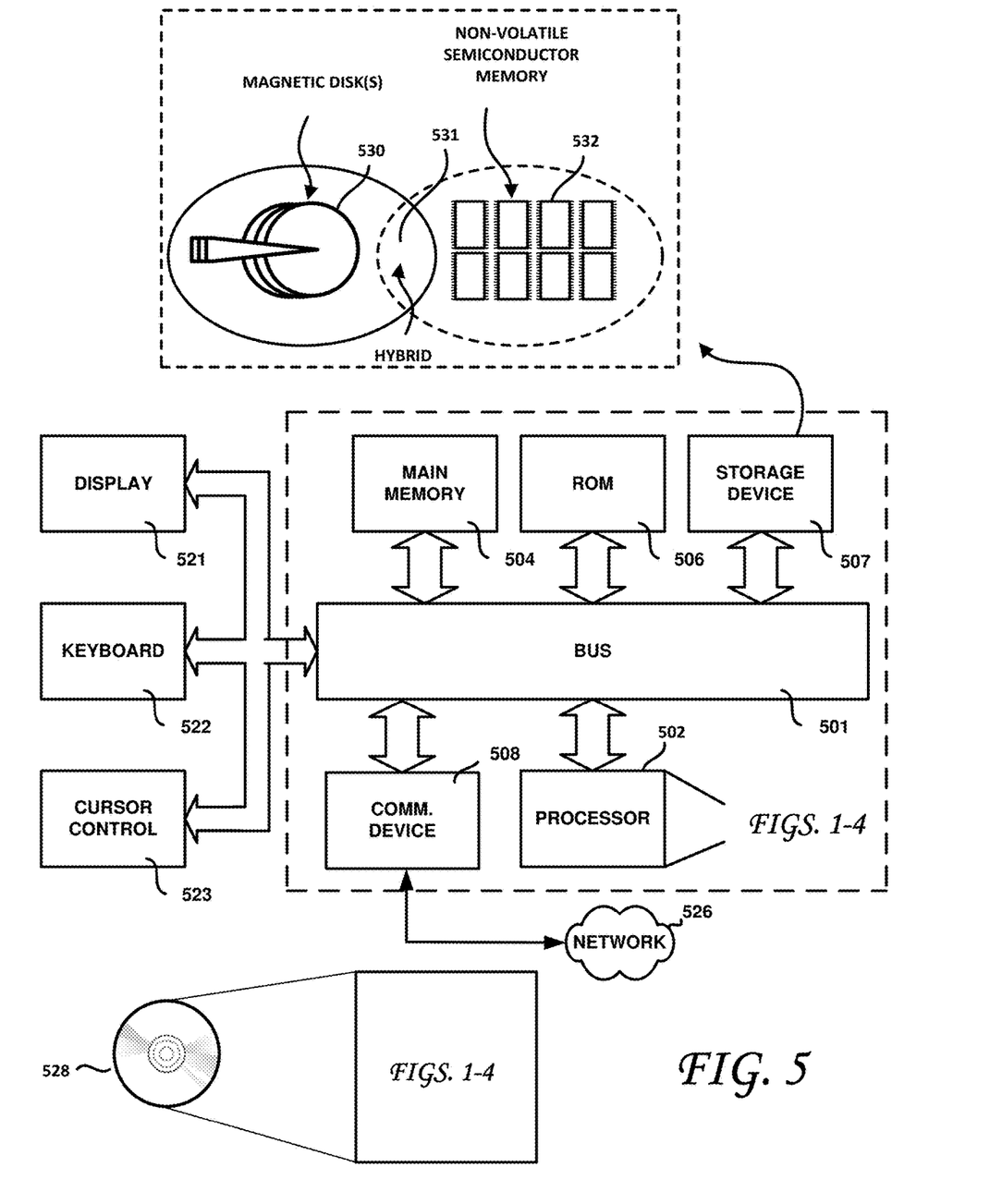
FIG. 5 is a block diagram of a computing device with which the embodiments shown and described herein may be practiced.

FIG. 5 illustrates a block diagram of a computing device with which embodiments may be implemented. The computing device of FIG. 5 may include a bus 501 or other communication mechanism for communicating information, and one or more processors 502 coupled with bus 501 for processing information. The computing device may further comprise a random-access memory (RAM) or other dynamic storage device 504 (referred to as main memory), coupled to bus 501 for storing information and instructions to be executed by processor(s) 502. Main memory (tangible and non-transitory, which terms, herein, exclude signals per se and waveforms) 504 also may be used for storing temporary variables or other intermediate information during execution of instructions by processor 502. The computing device of FIG. 5 may also include a read only memory (ROM) and/or other static storage device 506 coupled to bus 501 for storing static information and instructions for processor(s) 502. A data storage device 507, such as a magnetic disk and/or solid-state data storage device may be coupled to bus 501 for storing information and instructions—such as would be required to carry out the functionality shown and disclosed relative to FIGS. 1-4. The computing device may also be coupled via the bus 501 to a display device 521 for displaying information to a computer user. An alphanumeric input device 522, including alphanumeric and other keys, may be coupled to bus 501 for communicating information and command selections to processor(s) 502. Another type of user input device is cursor control 523, such as a mouse, a trackball, or cursor direction keys for communicating direction information and command selections to processor(s) 502 and for controlling cursor movement on display 521. The computing device of FIG. 5 may be coupled, via a communication interface (e.g., modem, network interface card or NIC) 508 to the network 526.

As shown, the storage device 507 may include direct access data storage devices such as magnetic disks 530, non-volatile semiconductor memories (EEPROM, Flash, etc.) 532, a hybrid data storage device comprising both magnetic disks and non-volatile semiconductor memories, as suggested at 531. References 504, 506 and 507 are examples of tangible, non-transitory computer-readable media having data stored thereon representing sequences of instructions which, when executed by one or more computing devices, implement aspects of the distributed system and methods described and shown herein. Some of these instructions may be stored locally in a client computing device, while others of these instructions may be stored (and/or executed) remotely and communicated to the client computing over the network 526. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 528. For example, reference 528 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 528 may be embodied as an encrypted solid-state drive. Other implementations are possible.

Embodiments of the present invention are related to the use of computing devices to check the consistency of replicated data stored at disparate storage services. According to one embodiment, the methods, devices and systems described herein may be provided by one or more computing devices in response to processor(s) 502 executing sequences of instructions, embodying aspects of the computer-implemented methods shown and described herein, contained in memory 504. Such instructions may be read into memory 504 from another computer-readable medium, such as data storage device 507 or another (optical, magnetic, etc.) data carrier, such as shown at 528. Execution of the sequences of instructions contained in memory 504 causes processor(s) 502 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it is to be noted that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method, comprising:
   receiving from a first data storage, over a computer network, first metadata associated with a first data that is stored at the first data storage;
   receiving from a second data storage that is separate and different from the first data storage, over the computer network, second metadata associated with a second data that is stored at the second data storage, both the first metadata and the second metadata being generic to the first data storage and to the second data storage;
   determining whether the first data stored at the first data storage is equivalent to the second data stored at the second data storage by comparing the received first metadata and the received second metadata, after the first data has settled following one of a first predetermined event and an execution of a predetermined mutation of an ordered sequence of mutations on the first data in the first data storage and after the second data has settled following one of a second predetermined event and an execution of the predetermined mutation on the second data in the second data storage, and
   changing one of the first data associated with the first metadata and the second data associated with the second metadata when comparing indicates that the received first metadata and the received second metadata are dissimilar,
   thereby to render the first data stored in the first data storage and the second data stored in the second data storage equivalent to one another.

2. The computer-implemented method of claim 1, wherein receiving from the first data storage includes querying the first data storage for the first metadata and wherein receiving from the second data storage includes querying the second data storage for the second metadata.

3. The computer-implemented method of claim 1, wherein receiving from the first data storage includes receiving a notification from the first data storage after one of the first predetermined event and the execution of the predetermined mutation of the ordered sequence of mutations and wherein receiving from the second data storage includes receiving a notification from the second data storage after one of the second predetermined event and the execution of the predetermined mutation of the ordered sequence of mutations.

4. The computer-implemented method of claim 1, wherein the first metadata is metadata of the first data after the first predetermined event or after the first data has settled following execution of the predetermined mutation of the ordered sequence of mutations and wherein the second metadata is metadata of the second data after the second predetermined event or after the second data has settled following execution of the predetermined mutation of the ordered sequence of mutations.

5. The computer-implemented method of claim 1, wherein the first metadata and the second metadata are of a type from block size, filename, size, user name, user permissions and checksum.

6. The computer-implemented method of claim 1, wherein the first predetermined event and the second predetermined event include one of a create event, an append event and a close request.

7. The computer-implemented method of claim 1, wherein the ordered sequence of mutations is ordered using a unique and strictly ordered global sequence number.

8. The computer-implemented method of claim 1, wherein the first and second data storages are each one of homogeneous and heterogeneous.

9. A computing device, comprising:
a memory;
a processor, and
a plurality of processes spawned by the processor, the processes being configured to enable consistency checks across storage services, the plurality of processes comprising processing logic to:
receive from a first data storage, over a computer network, first metadata associated with a first data that is stored at the first data storage;
receive from a second data storage that is separate and different from the first data storage, over the computer network, second metadata associated with a second data that is stored at the second data storage, both the first metadata and the second metadata being generic to the first data storage and to the second data storage;
determine whether the first data stored at the first data storage is equivalent to the second data stored at the second data storage by comparing the received first metadata and the received second metadata, after the first data has settled following one of a first predetermined event and an execution of a predetermined mutation of an ordered sequence of mutations on the first data in the first data storage and after the second data has settled following one of a second predetermined event and an execution of the predetermined mutation on the second data in the second data storage, and changing one of the first data associated with the first metadata and the second data associated with the second metadata when comparing indicates that the received first metadata and the received second metadata are dissimilar,
thereby to render the first data stored in the first data storage and the second data stored in the second data storage equivalent to one another.

10. The computing device of claim 9, wherein the processing logic for receiving from the first data storage includes processing logic for querying the first data storage for the first metadata and wherein the processing logic receiving from the second data storage includes processing logic for querying the second data storage for the second metadata.

11. The computing device of claim 9, wherein the processing logic for receiving from the first data storage includes processing logic for receiving a notification from the first data storage after execution of the predetermined mutation of the ordered sequence of mutations and wherein the processing logic for receiving from the second data storage includes processing logic for receiving a notification from the second data storage after execution of the predetermined mutation of the ordered sequence of mutations.

12. The computing device of claim 9, wherein the first metadata is metadata of the first data after the first predetermined event or after the first data has settled following execution of the predetermined mutation of the ordered sequence of mutations on the first data in the first data storage and wherein the second metadata is metadata of the second data after the second predetermined event or after the second data has settled following execution of the predetermined mutation of the ordered sequence of mutations on the second data in the second data storage.

13. The computing device of claim 9, wherein the first metadata and the second metadata are of a type from block size, filename, size, user name, user permissions and checksum.

14. The computing device of claim 9, wherein the first predetermined event and the second predetermined event each include one of a create event, an append event and a close request.

15. The computing device of claim 9, wherein the ordered sequence of mutations is ordered using a unique and strictly ordered global sequence number.

16. The computing device of claim 9, wherein the first and second data storages are each one of homogeneous and heterogeneous.

* * * * *